United States Patent [19]

Doubtfire

[11] Patent Number: 5,721,894
[45] Date of Patent: Feb. 24, 1998

[54] JUMP PREDICTION

[75] Inventor: Edward William Doubtfire, Bury, England

[73] Assignee: International Computers Limited, London, United Kingdom

[21] Appl. No.: 597,864

[22] Filed: Feb. 7, 1996

[30] Foreign Application Priority Data

Mar. 9, 1995 [GB] United Kingdom .............. 9504743

[51] Int. Cl.$^6$ ............................................. G06F 9/38
[52] U.S. Cl. .................. 395/587; 395/421.03; 395/421.1
[58] Field of Search .................................. 395/570, 586, 395/587, 414, 421.02, 421.03, 421.1

[56] References Cited

U.S. PATENT DOCUMENTS 5,553,253  9/1996  Pan et al. .............................. 395/587

FOREIGN PATENT DOCUMENTS 0 320 098  6/1989  European Pat. Off. .

OTHER PUBLICATIONS

"Polymorphic Branch Predictor", IBM Technical Disclosure Bulletin, vol. 37, No. 07, Jul. 1994, pp. 109–113.

Pan, "Improving the Accuracy of Dynamic Branch Prediction Using Branch Correlation", ACM SIGPLAN Notices, vol. 27, No. 9, Sep. 1992, pp. 76–84.

"Branch History Indexing with Execution Path Information", IBM Technical Disclosure Bulletin, vol. 36, No. 08, Aug. 1993, pp. 557–558.

Chang, "Alternative Implementations of Hybrid Branch Predictors", IEEE Symposium on Microarchitecture, Nov. 29–Dec. 1, 1995, pp. 252–257.

Pan et al., "Improving the Accuracy of Dynamic Branch Prediction Using Branch Correlation", ASPLOS V, ACM, Oct. 1992, pp. 76–84.

*Primary Examiner*—William M. Treat
*Attorney, Agent, or Firm*—Lee, Mann, Smith, McWilliams, Sweeney & Ohlson

[57] ABSTRACT

A pipelined data processing system has a jump prediction mechanism for predicting the outcomes of jump instructions. The prediction mechanism includes a jump prediction memory which provides the predictions. The jump prediction memory is addressed by a jump signature, formed by adjustably selecting bits from an address value and from a jump path value. The address value is based on the address of the jump instruction and the jump path value is based on a history of recently executed jump instructions prior to said jump instruction. A mode register is used to indicate, for each bit of the jump signature, whether that bit is to be selected from the address value or from the jump path value. Adjustment of the contents of the mode register allows fine tuning of the jump prediction mechanism to optimize performance.

8 Claims, 3 Drawing Sheets

JUMP PREDICTION

BACKGROUND OF THE INVENTION

This invention relates to a jump prediction mechanism for a pipeline data processing system.

In data processing systems, instructions are normally executed sequentially. However, some instructions, referred to as jump or branch instructions, may cause a jump to an instruction out of this normal sequence. The jump instruction may be unconditional, which means that the jump is made whenever the jump is executed. Alternatively, the jump instruction may be conditional, which means that a jump is made only if a specified condition is satisfied (e.g. if the contents of an accumulator register are greater than zero). The target address of the jump (i.e. the address to which the jump is made, when taken) may be specified in a number of different ways. In the case of an absolute jump instruction, the jump is made to a specified absolute address. In the case of a relative jump instruction, the jump is made to an address displaced by a specified amount from the current instruction address. The target address may be obtained from a register, or may be specified in the instruction as a literal.

In a pipelined processor, conditional jump instructions present a particular problem. In general, the actual outcome (jump or no jump) of the jump instruction will not be known until the instruction approaches the end of the pipeline. It is therefore necessary to predict the outcome of the jump instruction, and to fetch subsequent instructions on the basis of this prediction. If the prediction was correct, processing can continue without any break. If, on the other hand, the prediction proves incorrect, it is necessary to abandon any instructions subsequent to the jump. Hence, it can be seen that it is desirable to predict the outcome of jump instructions accurately, so as to avoid breaks in processing.

Various techniques have been used for jump prediction. One method uses a hash address formed from the current program counter value (i.e. from the address of the jump instruction) to address a jump prediction table. The table stores the predicted outcome of the jump. If the prediction proves to be incorrect, a suitable correction is made to the jump prediction table. This method is based on the assumption that if the same jump instruction is encountered again, it is quite likely that its outcome will be the same.

Alternatively, it has been proposed to use a jump path value to address a jump prediction table. The jump path comprises a sequence of bits forming a serial record of the outcomes of recently executed conditional jump instructions. This is a representation of the path taken to arrive at a particular jump instruction. For example, if 1 indicates a jump, and 0 indicates no jump, then a jump path value 1110 indicates that the last three jump instructions resulted in a jump, while the previous one resulted in no jump.

The design of a large pipelined processor is very complex, and even with simulation of the design it is difficult to decide in advance what the best form of jump prediction technique will be for a particular processor. However, once the processor has been designed and tested, it is usually too late to change the jump prediction mechanism.

The object of the present invention is to provide a novel form of jump prediction mechanism which allows the jump prediction technique to be modified without changes to the hardware design. This allows fine tuning of the jump prediction mechanism.

SUMMARY OF THE INVENTION

According to the invention there is provided a pipelined data system having a jump prediction mechanism for predicting the outcome of a jump instruction, the prediction mechanism comprising:

a) a jump prediction memory;

b) means for forming an address value, based on the address of the jump instruction;

c) means for forming a jump path value, based on a history of jump instructions executed prior to said jump instruction;

d) means for forming a jump signature, by selecting an adjustable number of bits from said address value and an adjustable number of bits from said jump path value; and e) means for using said jump signature to address said jump prediction memory, to read out a jump prediction value from said memory, thereby providing a prediction of the outcome of said jump instruction.

It can be seen that the invention provides a combination of two jump prediction techniques, one based on a jump path and the other on the jump instruction address. The way in which the two techniques are combined is adjustable, allowing fine tuning of the performance of the jump prediction mechanism to be achieved.

DESCRIPTION OF AN EMBODIMENT OF THE INVENTION

One pipelined data processing system in accordance with the invention will now be described by way of example with reference to the accompanying drawings.

System Overview

Figure 1:
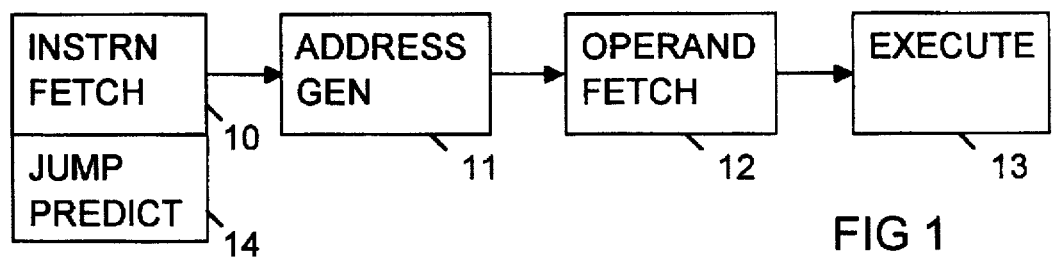
FIG. 1 is a block diagram of a pipelined data processing system embodying the invention.

Referring to FIG. 1, the system comprises four pipeline units as follows:

an instruction fetch unit 10;

an operand address generation unit 11;

an operand fetch unit 12;

an execution unit 13.

The instruction fetch unit fetches a sequence of instructions from a code slave (cache) store, or else initiates a main memory access to load the instructions into the slave. The instructions are then passed to the operand address generation unit. The instruction address from which the instruction is to be fetched is determined by a program counter (PC). Normally the instructions are fetched sequentially from consecutive memory locations, so that the PC is incremented each time a new instruction is fetched.

The instruction fetch unit includes a jump prediction mechanism 14, which predicts the outcome of conditional literal jump instructions, using a jump prediction memory. The prediction is represented by a signal DoJump as follows:

DoJump=0: no jump

DoJump=1: jump.

If DoJump=0, the PC is simply incremented in the normal way. If on the other hand DoJump=1, the PC is loaded with a jump target address, derived from the jump instruction.

The prediction mechanism does not attempt to predict the outcome of non-literal conditional jumps: the instruction fetch unit simply assumes that the jump is not taken. In the case of an unconditional jump, no prediction is necessary: the jump is always taken.

The operand address generation unit receives instructions from the instruction fetch unit and processes them so as to generate the addresses of the instruction operands. The operand addresses are passed to the operand fetch unit.

The operand fetch unit retrieves the operands from a data slave (cache) store, if they are present in the slave, or else initiates a main memory access to load the operands into the slave.

The execution unit performs arithmetic or logical operations on the operands as specified by the instructions. The results of these operations are used to update internal registers, or are written back into the data slave and/or the main memory. In the case of a conditional jump instruction, the execution unit determines whether or not the specified jump condition is satisfied, i.e. whether or not a jump should have been made. From this, the execution unit determines whether a correction is necessary to the program counter (PC), either because of a wrongly predicted conditional literal jump instruction, or because a non-literal conditional jump instruction resulted in a jump. If a correction is necessary, the execution unit sends a signal to the instruction fetch unit, informing it of the new PC value.

Jump Prediction Mechanism

Figure 2:
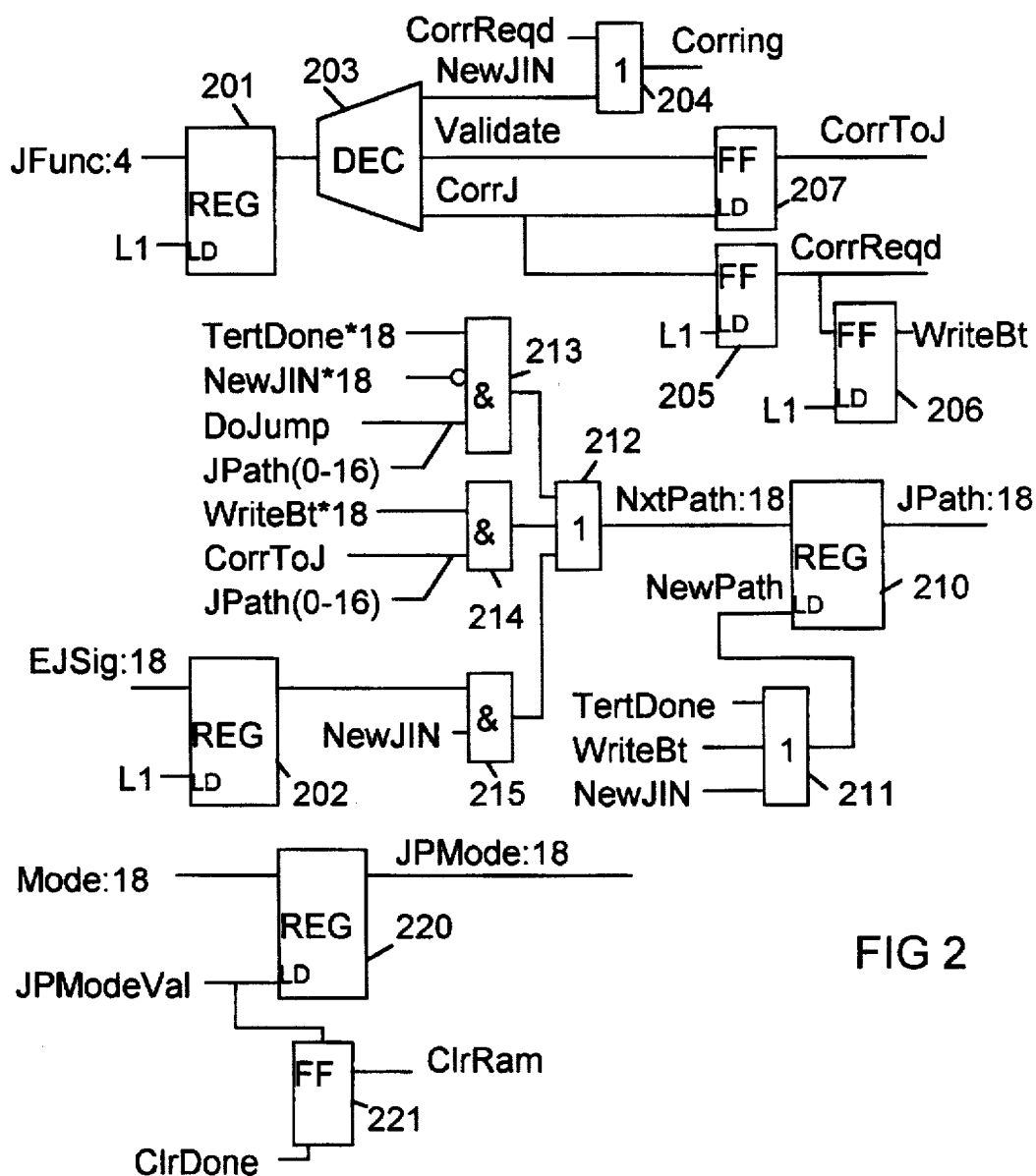
FIGS. 2–4 are circuit diagrams showing a jump prediction mechanism for the processing system.
Figure 3:
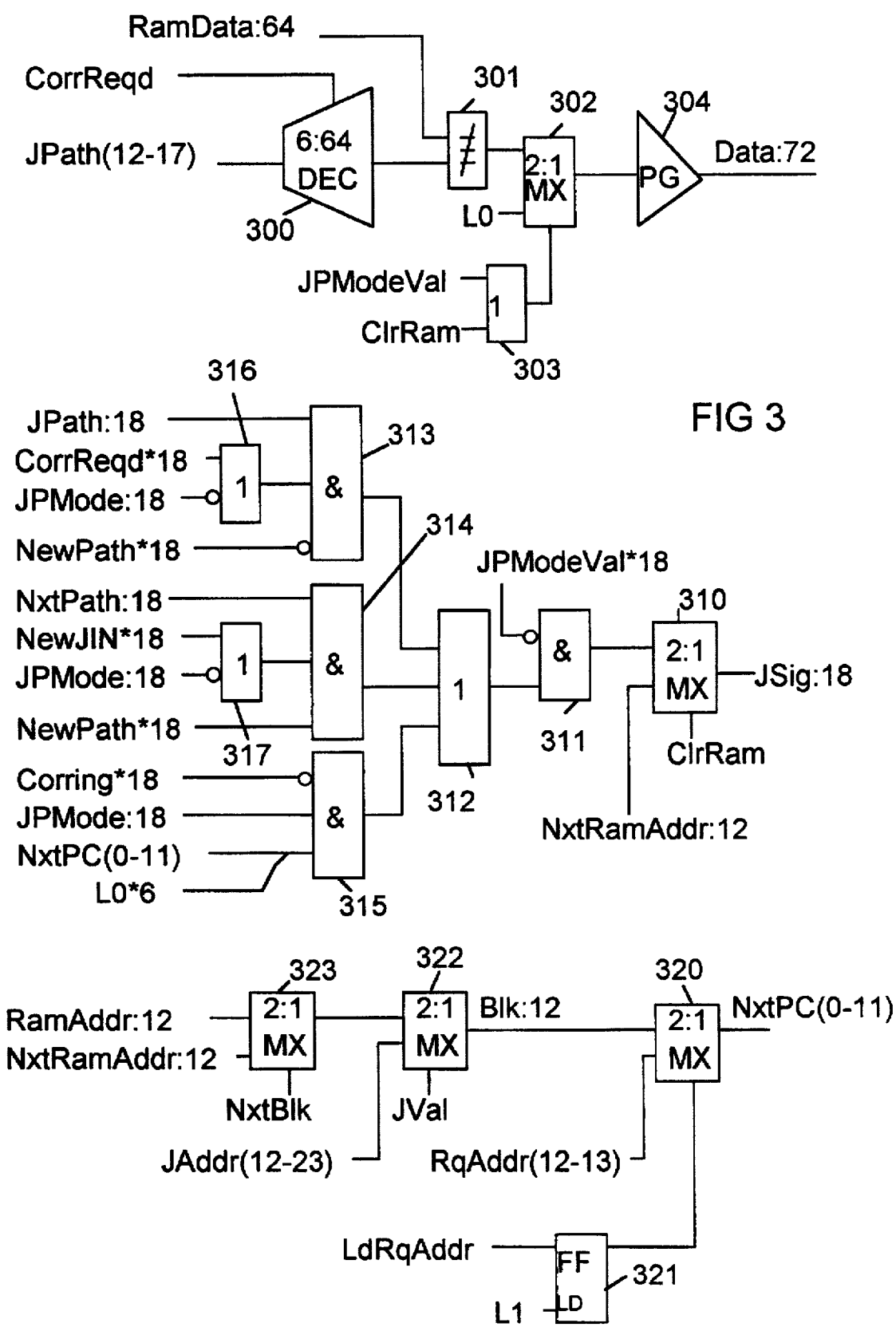
Figure 4:
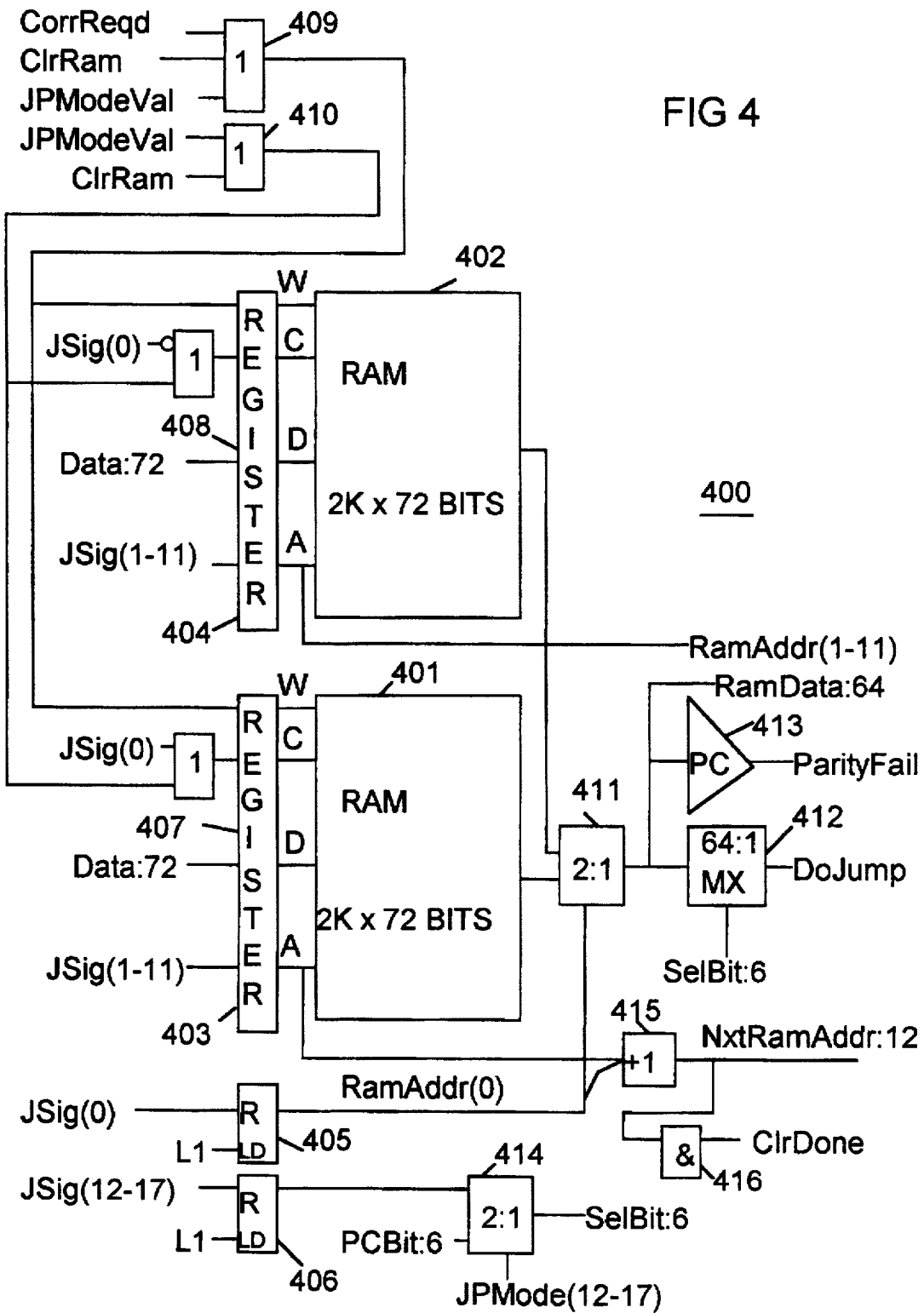

FIGS. 2–4 show the jump prediction mechanism in detail. In these figures, the following conventions are used:

a number after a semicolon indicates the number of bits in a multi-bit signal. For example, JSig:18 represents an 18-bit signal.

a number in brackets represents a subset of the bits of a multi-bit signal. For example, JSig(1–11) represents bits 1 to 11 of the signal JSig:18.

a number after an asterisk indicates multiple copies of a single-bit signal. For example, NewPath*18 represents an 18-bit signal, each bit of which is equal to the signal NewPath.

Also in these figures, the symbols L0 and L1 represent low and high logic levels. The figures show a number of registers, and it is implicit that each of these registers has a clock input which receives a system clock signal. Each register also has a load enable input LD: when this input is high, the register is loaded at the next clock beat. It will be seen that if the load enable input of a register is connected to L1, that register will be loaded with a new value at each clock beat.

Referring to FIG. 2, whenever the execution unit executes a jump instruction, it produces a 4-bit jump function JFunc:4 which indicates the nature and the outcome of the jump, and an 18-bit recovered jump signature EJSig:18. JFunc:4 is loaded into a register 201, and EJSig:18 is loaded into a register 202. The contents of the register 201 are then decoded by a decoder circuit 203 to produce control signals NewJIN, CorrJ and Validate.

NewJIN, when true, indicates that the execution unit has executed a jump instruction which requires a correction to the program counter. This may occur either because of a wrongly predicted conditional literal jump instruction, or because a non-literal conditional jump instruction resulted in a jump. NewJIN enables an OR gate 204, producing a signal Corring.

CorrJ, when true, indicates that a conditional literal jump instruction has been executed, and that the prediction made for that instruction was wrong. This signal sets a flip-flop (single bit register) 205 at the next clock beat, producing a signal CorrReqd. In turn, CorrReqd sets a flip-flop 206 at the next again clock beat, producing a signal WriteBt. CorrReqd is also fed to an input of the OR gate 204.

Validate, when true, indicates that the required correction is from NO JUMP to JUMP. The Validate signal is clocked into a flip-flop 207 by CorrJ. The output of the flip-flop 207 is a signal CorrToJ.

The prediction mechanism also includes a jump path register 210, which holds an 18-bit jump path JPath:18. This contains a record of the outcomes of the last eighteen conditional literal jumps encountered. Each bit represents the outcome of one jump, the most significant bit JPath(0) corresponding to the most recently executed jump. The value 1 indicates that the jump was taken and the value 0 indicates that the jump was not taken.

The jump path register 210 is loaded with a new value NxtPath:18 when a signal NewPath is true. NewPath is produced by an OR gate 211 which receives three input signals: TertDone, WriteBt and NewJIN. TertDone is a signal from the instruction fetch unit 10, indicating that a conditional literal jump has been processed by that unit.

NxtPath:18 comes from a set of eighteen OR gates 212. Each of these OR gates has three inputs, connected to respective outputs of three sets of eighteen AND gates 213, 214 and 215.

The AND gates 213 receive an 18-bit signal, comprising the current jump prediction signal DoJump as the most significant bit, and bits JPath(0–16) from the jump path register. Each of the AND gates 213 also receives the control signals TertDone and the inverse of NewJIN.

The AND gates 214 receive an 18-bit signal, comprising CorrToJ as the most significant bit, and bits JPath(0–16) from the jump path register. Each of the AND gates 214 also receives the control signal WriteBt.

The AND gates 215 receive the recovered jump signature from the register 202. Each of the AND gates 215 also receives the control signal NewJIN.

Thus, it can be seen that the jump path register 210 is loaded with a new value if any one of the signals TertDone, WriteBt or NewJIN is true. If Tertdone is true and NewJIN is false, the contents of the path register are replaced by the existing contents, shifted right by one bit, with DoJump inserted at the left-hand end (i.e. in the most significant bit position). If WriteBt is true, the contents of the path register are replaced by the existing contents, shifted right by one bit, with CorrToJ inserted at the left-hand end. If NewJIN is true, the contents of the path register are replaced by the recovered jump signature from the register 202.

The prediction mechanism also includes a mode register 220. This is loaded with an 18-bit value Mode:18 when a signal JPModeVal goes true. The value loaded into the mode register consists of a sequence of zeroes followed by a sequence of ones. The output of this register provides a jump prediction mode signal JPMode:18. Each bit of this signal indicates how the corresponding bit of a jump signature JSig:18 is to be formed. JPMode(i)=0 indicates that JSig(i) is to be derived from the corresponding bit JPath(i) of the jump path, and JPMode(i)=1 indicates that JSig(i) is to be derived from the corresponding bit of a next program counter value (NxtPC). For example, if:

JPath=010111011110011000
NxtPC=011101100010000000
JPMode=000000111111111111 then:

JSig=010111100010000000

The logical width of the jump path register is thus defined by the number of leading zeroes in JPMode.

When JPModeVal goes true, it also sets a flip-flop 221, producing a signal ClrRam. As will be described, this initiates a RAM clearing operation. When clearing is complete, the flip-flop 221 is reset by a signal ClrDone.

Referring to FIG. 3, bits JPath(12–17) of the jump path are fed to the input of a 6:64 decoder 300. The enable input of the decoder receives CorrReqd. The output of the decoder is combined with a RamData:64 signal in a set of 64 non-equivalence (exclusive OR) gates 301. When the decoder is not enabled, all of its 64 outputs are false, and in this case it can be seen that the gates 301 simply pass the RamData signal without any alteration. When the decoder is enabled, it decodes JPath(12–17), causing one of the decoder output lines to go true. This inverts one of the bits of RamData.

The 64-bit output of the gates 301 is fed to one input of a 2:1 multiplexer 302, the other input of which receives a low logic level signal. The multiplexer 302 is controlled by the output of an OR gate 303, which has inputs JPModeVal and ClrRam. The 64-bit output of the multiplexer 302 is fed to a parity generation circuit 304, which adds 8 parity bits to produce a signal Data:72, comprising 64 data bits and 8 parity bits.

FIG. 3 also shows circuitry for generating the jump signature JSig:18. The jump signature is produced from a 2:1 multiplexer 310 which normally selects the output of a set of 18 AND gates 311. However, when ClrRam is true, the multiplexer 310 instead selects NxtRamAddr:12.

The AND gates 311 receive the output of a set of 18 OR gates 312, and also the inverse of JPModeVal. The OR gates 312 have three sets of inputs, connected respectively to the outputs of three sets of 18 AND gates 313, 314 and 315.

The AND gates 313 receive JPath:18 and the outputs of a set of eighteen OR gates 316. Each of the AND gates 313 also receives the inverse of NewPath. The OR gates 316 receive the inverse of JPMode:18. Each of the OR gates 316 also receives CorrReqd.

The AND gates 314 receive NxtPath:18 and the outputs of a set of eighteen OR gates 317. Each of the AND gates 314 also receives NewPath. The OR gates 317 receive the inverse of JPMode:18. Each of the OR gates 317 also receives NewJin.

The AND gates 315 receive JPMode:18 and an 18-bit signal comprising a signal NxtPC(0–11) in its twelve most significant bit positions and zeroes in its six least significant bit positions. Each of the AND gates also receives the inverse of Corring.

The jump signature JSig:18 is used, as will be described, to address the jump prediction memory to obtain a jump prediction for a current jump instruction (see FIG. 4). The jump signature is also passed down the pipeline, along with the instruction. When the jump instruction reaches the execution stage of the pipeline, the value of the jump signature is passed back to the jump prediction mechanism as the recovered jump signature EJSig:18 described above.

NxtPC(0–11) provides an indication of the next program counter value. This signal comes from a 2:1 multiplexer 320, which is controlled by the output from a flip-flop 321. Normally, the multiplexer selects a 12-bit block count signal Blk:12. However, if the flip-flop 321 is set by a signal LdRqAddr, the multiplexer 320 instead selects a signal RqAddr(12–23). LdRqAddr indicates that a jump request is being made by instruction fetch for an execution unit jump. The requested address is RqAddr.

Blk:12 comes from a 2:1 multiplexer 322. Normally, this multiplexer selects the output of a further 2:1 multiplexer 323. However, if a control signal JVal is true, the multiplexer 322 instead selects a signal JAddr(12–23). JVal indicates that a jump is to be taken, and JAddr is the target address of the jump (i.e. the new value of the PC).

The multiplexer 323 selects either a signal RamAddr:12 or a signal NxtRamAddr:12, according to whether a control signal NxtBlk is false or true. NxtBlk is the carry-out from bit 23 of the program counter PC, and hence indicates that a new block of instructions is being processed.

Referring to FIG. 4, the jump prediction mechanism also includes a jump prediction memory 400, comprising two RAMs (random access memories) 401,402. Each RAM contains 2K words, each word containing 72 bits: 64 data bits and 8 parity bits. The RAMs have input registers 403,404 which are loaded with new values at each clock beat. Each of the input registers holds:

an 11 bit address A, which is fed to the address input of the RAM;

a 72 bit data-plus-parity value D, which is fed to the data input of the RAM;

a select bit C, which is fed to the select input of the RAM; and a write enable bit W, which is fed to the write enable input of the RAM.

The input data bits D for both RAMs are supplied by the Data:72 signal from the circuit 300–304 in FIG. 3.

The memory is addressed by the jump signature JSig:18. At each clock beat, bits JSig(1–11) are loaded into the address bits A of both input registers. At the same time, the most significant bit JSig(0) of the jump signature is loaded into a single bit register 405, and bits JSig(12–17) are loaded into a 6-bit register 406.

The select bits C for RAM 401 are supplied by an OR gate 407, one input of which receives the most significant bit JSig(0) of the jump signature. Similarly, the select bits C for RAM 402 are provided by an OR gate 408 one input of which receives the inverse of the most significant bit JSig(0) of the jump signature. The other inputs of the two OR gates 407,408 both receive the output of an OR gate 409, which receives two input signals: JPModeVal and ClrRam. Normally, the output of OR gate 409 is false. In this case, if JSig(0)=0 then RAM 402 is selected, and if JSig(0)=1 then RAM 401 is selected. If the output of OR gate 409 is true, both RAMs are selected.

The write enable bits W for both RAMs are supplied by an OR gate 410 which receives three inputs: CorrReqd, ClrRam, and JPModeVal.

Each RAM produces a 72-bit parallel output: 64 data and 8 parity. The outputs of the two RAMs are fed to a 2:1 multiplexer circuit 411, controlled by a signal RamAddr(0) from the register 405, such that if RamAddr(0)=0 then the output of RAM 402 is selected; otherwise the output of RAM 401 is selected. The data bits from the multiplexer provide the signal RamData:64. These data bits are fed to a 64:1 multiplexer 412, controlled by a 6-bit signal SelBit:6, which selects one of the data bits. The output of the multiplexer 412 is the signal DoJump which represents the current jump prediction. The data and parity bits selected by the multiplexer 411 are also fed to a parity checker circuit 413, which produces a ParityFail signal if an error is detected.

The signal SelBit:6 is supplied by a set of six 2:1 multiplexers 414, which are controlled by respective bits of a 6-bit signal JPMode(12–17). The first inputs of these multiplexers receive the outputs of the register 406, while the second inputs receive a signal PCBit:6, which represents the least significant bits of the current program counter value.

The signal RamAddr:12 is derived from the address bits A of register 404 and from the register 405. RamAddr:12 indicates the current address applied to the RAMs. A similar signal, derived from registers 403 and 405, is fed to an incrementer circuit 415 to produce the signal NxtRamAddr:12. The 12 bits of NxtRamAddr:12 are combined in an AND gate 416, to produce the signal ClrDone.

In summary, it can be seen that the jump prediction DoJump is obtained by reading a single bit from the prediction RAMs. This bit is selected by using the jump signature JSig to select one word from the RAMs, and then using SelBit to select one bit from this word. JSig and SelBit are both formed by selecting bits from the jump path and from the program counter. The selection of bits from these two sources is controlled by the jump prediction mode JPMode.

The operation of the jump prediction mechanism will now be described.

Initialisation of the RAMs

When the system is initialised, JPModeVal goes true, and a mode value is loaded into the mode register. JPModeVal will then remain true, until the system is reinitialised.

JPModeVal sets the flip-flop 221, making ClrRam true. ClrRam switches the multiplexer 302, so that the input data to the RAMs is set to an all zero pattern. ClrRam also switches the multiplexer 310, so that it selects NxtRamAddr:12. Thus, at each clock beat, the address applied to the address inputs of the RAMs 401, 402 is incremented. At the same time, ClrRam enables the OR gate 409, so that both RAMs are enabled for writing. ClrRam also enables the OR gate 410, so that both RAMs are selected. Thus, it can be seen that the effect of ClrRam is to cause the RAMs to be cleared, by writing an all-zero pattern into each location. When all the locations have been written, the signal ClrDone goes true, resetting the flip-flop 221 and thus terminating the reset mode.

Normal Operation

In normal operation (i.e when no PC correction is indicated by the execution unit), NewPath, Corring, NewJIN and CorrReqd are all false. Hence, the circuits 310–317 form the jump signature JSig:18 as follows:

JSig=(JPath AND NOT JPMode) OR (NxtPC AND JPMode).

In other words, the jump signature is formed by selecting bits from JPath that correspond to 0's in JPMode and selecting bits from NxtPC that correspond to 1's in JPMode.

JSig:18 addresses the jump prediction RAMs, producing a new jump prediction DoJump.

If TertDone is true (i.e. the instruction just processed by the instruction fetch unit was a conditional literal jump), the AND gate 213 is enabled. This causes the current jump prediction DoJump to be shifted into to the most significant end of the jump path register, so as to update the jump path.

Wrongly Predicted Literal Conditional Jump

If the execution unit executes a conditional literal jump instruction which was wrongly predicted, it sends the jump prediction mechanism a JFunc signal which, when decoded in the decoder 203, makes NewJIN and CorrJ both true.

NewJIN enables the AND gate 215, making NxtPath:18 equal to the recovered jump signature stored in the register 202. It will be appreciated that this recovered jump signature represents the value of JSig that was current when the incorrect jump prediction was made. NewJIN also makes Corring and NewPath both true. NewPath enables the AND gates 314, making JSig equal to NxtPath.

At the first clock beat, NxtPath is loaded into the jump path register 210, and at the same time JSig is loaded into the RAM address registers. In other words, the recovered jump signature is loaded into both the jump path register and the RAM address registers. Thus, it can be seen that the jump path register and the RAM address registers are restored to the values they had when the wrong prediction was made. Also at the same time, the flip-flop 205 is set, making CorrReqd true, and the value of Validate is loaded into the flip-flop 207.

The existing contents of the addressed location of the RAMs are now read out as RamData:64. At the same time, CorrReqd enables the decoder 300, so as to decode JPath (12–17). The output of the decoder is combined with RamData:64 in the exclusive-OR gates 301. The effect of this is to invert the bit of RamData:64 that caused the wrong prediction.

Then, at the next clock beat, the corrected data is loaded into the RAM data input registers. At the same time, CorrReqd sets the RAM write enable bits W, by way of OR gate 409. Also at this time, the flip-flop 206 is set, making WriteBt true, and the flip-flop 205 is reset, making CorrReqd false. WriteBt enables the AND gate 214, so as to form a corrected jump path value, by shifting CorrToJ into the most significant bit position of the current jump path value.

Finally, at the next again clock beat, the corrected data is written into the RAMs, and the corrected jump path value is loaded into the jump path register. The flip-flop 206 is reset, making WriteBt false.

Non-Literal Jumps

If the execution unit executes a non-literal jump instruction which results in a jump being taken, it sends a JFunc signal which, when decoded in the decoder 203, makes NewJIN true and CorrJ false. As before, NewJIN causes the recovered jump signature to be loaded into the jump path register 210, so as to restore the jump path to the value it had before the jump. However, no correction is made to the jump path, since WriteBt remains false, and no correction is made to the prediction RAMs since CorrReqd remains false.

Conclusion

It can be seen that the jump prediction mechanism described above uses a combination of two prediction techniques: one based on a jump path, and one based on the jump instruction address. The way in which these two techniques are combined is controlled by a bit pattern JPMode stored in the jump prediction mode register.

The value of JPMode is set when the system is initialised. This value may be adjusted, by experiment, so as to optimise the performance of the jump prediction mechanism. In other words, adjustment of JPMode provides a way of fine-tuning the jump prediction mechanism. Once an optimum value has been found for JPMode, it will normally always be set equal to that value each time the system is initialised.

It will be appreciated that many modifications may be made to the system described above without departing from the scope of the present invention.

I claim:

1. A pipelined data processing system having a jump prediction mechanism for predicting the outcome of a jump instruction, the prediction mechanism comprising:
   a) a jump prediction memory;
   b) means for forming an address value, based on the address of the jump instruction;
   c) means for forming a jump path value, based on a history of jump instructions executed prior to said jump instruction;
   d) a mode register specifying a first adjustable number of bits in said address value and specifying a second adjustable number of bits in said jump path value;

e) means responsive to said mode register, for forming a jump signature by selecting said first adjustable number of bits from said address value and selecting said second adjustable number of bits from said jump path value; and f) means for using said jump signature to address said jump prediction memory, to read out a jump prediction value from said memory, thereby providing a prediction of the outcome of said jump instruction.

2. A system according to claim 1 wherein said mode register comprises a plurality of bits, each of said bits indicating whether a corresponding bit of said jump signature is to be selected from said address value or from said jump path value.

3. A system according to claim 1 further including means for correcting said jump prediction memory in the event that said prediction is incorrect.

4. A system according to claim 1 wherein said jump path value comprises a sequence of bits, wherein a first bit value indicates that a conditional jump was taken, and a second bit value indicates that a conditional jump was not taken.

5. A jump prediction mechanism for a pipelined data processing system, comprising:

a) a jump prediction memory;

b) means for forming an address value, based on the address of the jump instruction;

c) means for forming a jump path value, based on a history of jump instructions executed prior to said jump instruction;

d) a mode register specifying a first adjustable number of bits in said address value and specifying a second adjustable number of bits in said jump path value;

e) means responsive to said mode register, for forming a jump signature by selecting said first adjustable number of bits from said address value and selecting said second adjustable number of bits from said jump path value; and f) means for using said jump signature to address said jump prediction memory, to read out a jump prediction value from said memory, thereby providing a prediction of the outcome of said jump instruction.

6. A jump prediction mechanism according to claim 5 wherein said mode register comprises a plurality of bits, each of said bits indicating whether a corresponding bit of said jump signature is to be selected from said address value or from said jump path value.

7. A jump prediction mechanism according to claim 5 further including means for correcting said jump prediction memory in the event that said prediction is incorrect.

8. A jump prediction mechanism according to claim 5 wherein said jump path value comprises a sequence of bits, wherein a first bit value indicates that a conditional jump was taken, and a second bit value indicates that a conditional jump was not taken.

* * * * *